United States Patent [19]

Greenway

[11] Patent Number: 5,265,320

[45] Date of Patent: Nov. 30, 1993

[54] METAL STAMPING

[76] Inventor: Glenn W. Greenway, 338 Elmwood-Apt. 4, Clawson, Mich. 48017

[21] Appl. No.: 734,267

[22] Filed: Jul. 22, 1991

[51] Int. Cl.⁵ .................................. H02K 15/02
[52] U.S. Cl. ........................... 29/596; 29/609; 310/42; 310/216
[58] Field of Search ............ 29/596, 598, 609; 310/216, 217, 42

[56] References Cited

U.S. PATENT DOCUMENTS 2,085,092  6/1937  Furth .
2,304,607  12/1942  Sleeter .
3,202,851  8/1965  Zimmerle et al. ............ 29/609 X
3,834,013  9/1974  Gerstle .

Primary Examiner—Carl E. Hall
Attorney, Agent, or Firm—Reising, Ethington, Barnard, Perry & Milton

[57] ABSTRACT

A method of progressive die stamping for cutting apertures in a sheet metal strip without producing stress induced distortion of the apertures after cut-off of the strip. The sheet metal strip is peened to form one dent between the aperture and one edge of the strip and to form another dent between the aperture and the other edge of the strip and subsequently cutting the strip with a cut-off punch. The peening operation may be done before, during or after the aperture punching operation.

2 Claims, 3 Drawing Sheets

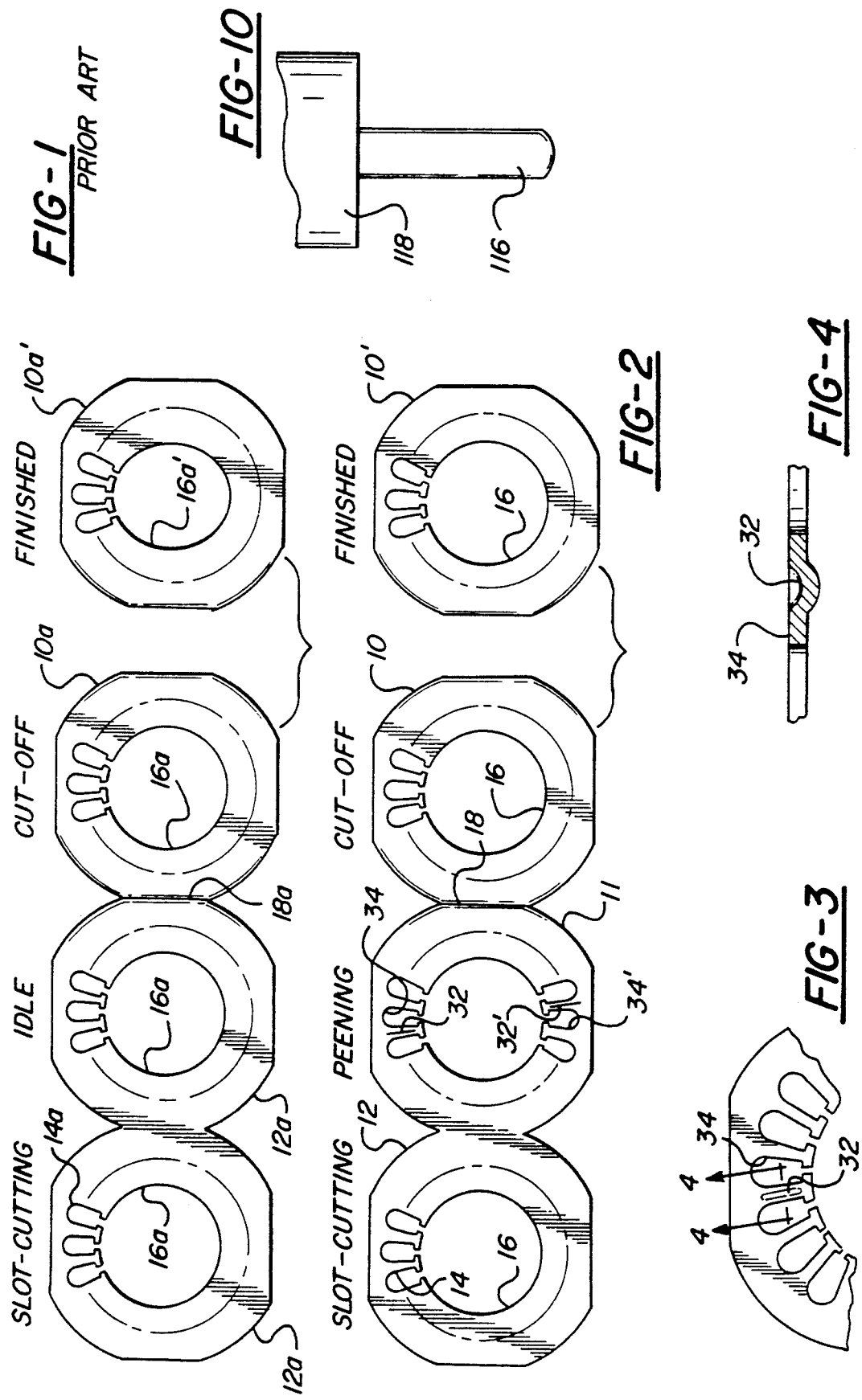

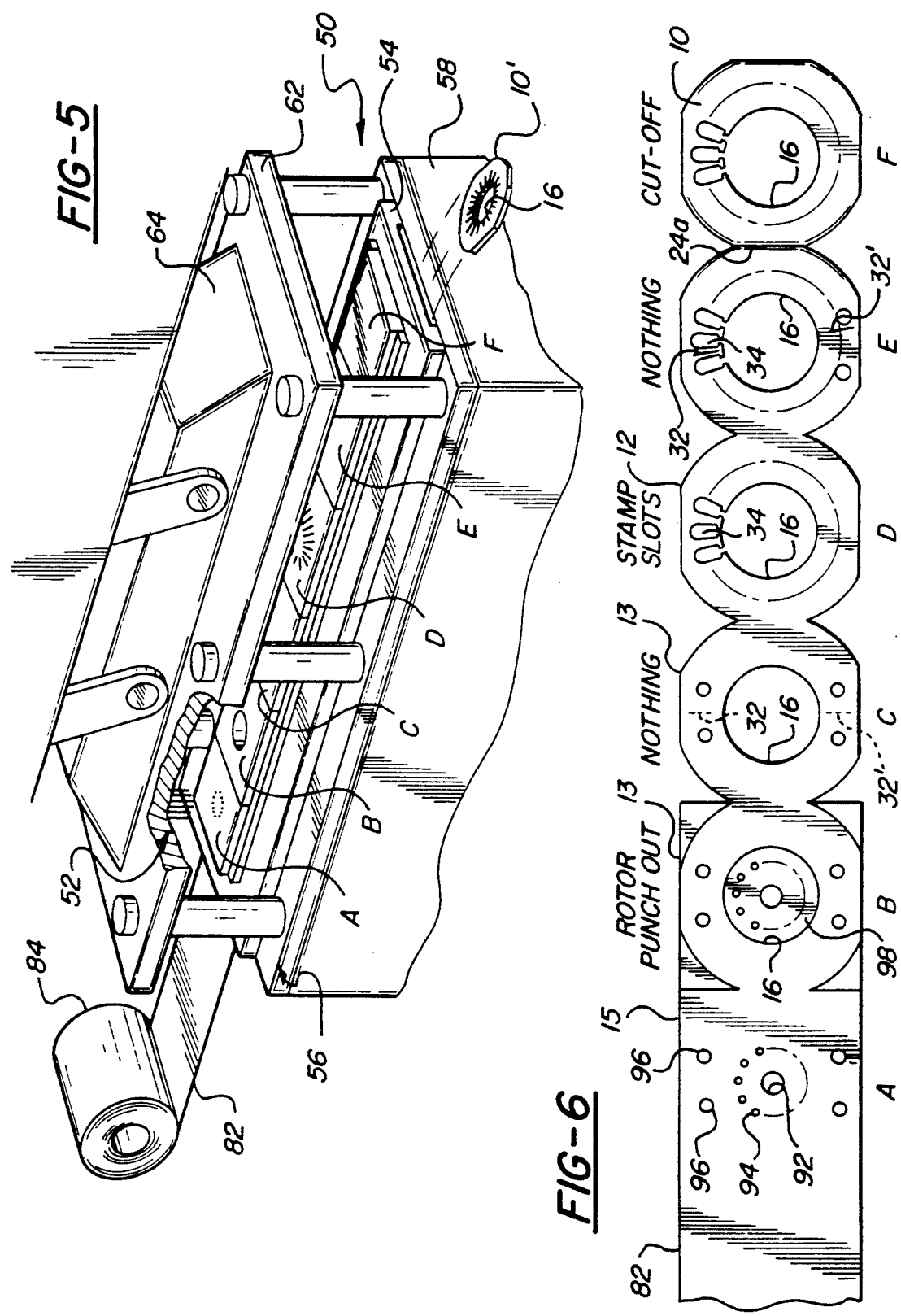

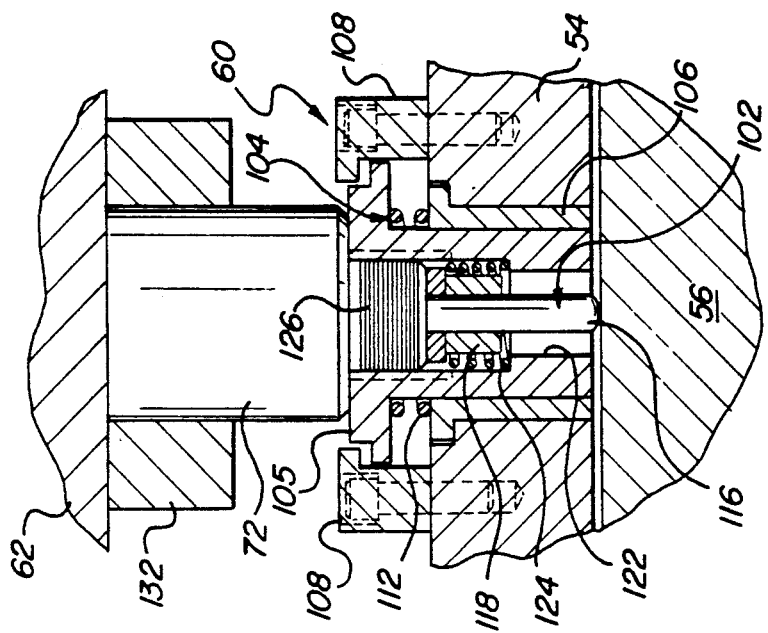
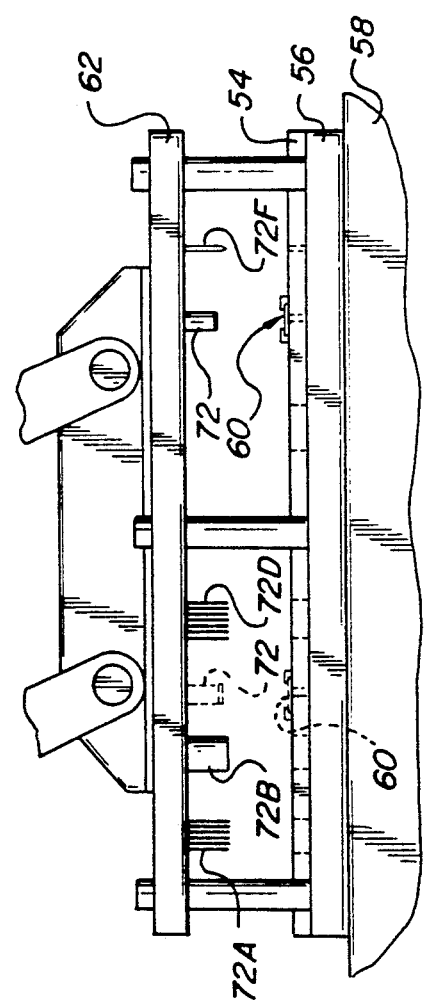
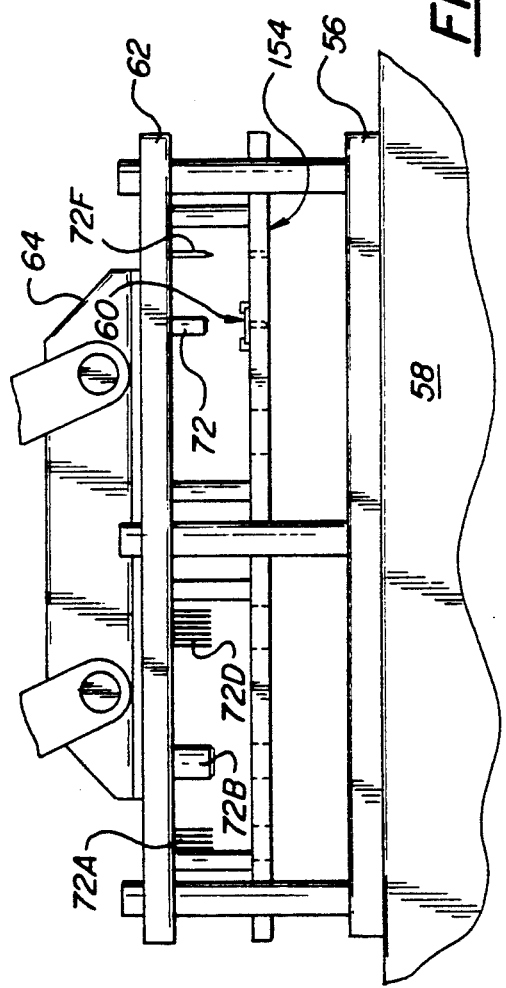

METAL STAMPING

FIELD OF THE INVENTION

This invention relates to metal stamping and more particularly, it relates to stamping of sheet metal to form apertures and outlines therein with exact shape, especially by progressive die stamping.

BACKGROUND OF THE INVENTION

There are many products of industrial manufacture which require sheet metal stampings with apertures or outline configurations which must be held to close tolerances. A particular example is that of laminations for forming the magnetic circuit cores of dynamoelectric machines, such as stator laminations for motors and generators. In the manufacture of laminated stator cores, the bore of the stator must be kept within close tolerances in order to realize high performance of the rotating machine. The laminations are made from sheet metal having special magnetic properties which is typically supplied in the form of coils of strip stock for high volume production by progressive die stamping. The die stamping operations are carefully controlled during blanking of the stator laminations from the sheet metal strip in order to achieve a high degree of dimensional accuracy. It is especially important to produce laminations with a stator bore which is round, i.e. substantially circular within very close tolerances.

Even though the stamping dies used for forming the laminations are made with a high degree of precision, there are many instances where the stator bores have dimensions outside the desired tolerances. It is not uncommon for the stator bore in an individual lamination to be substantially out-of-round. It has been found that even though the stator bore is of circular shape as it is formed in the sheet metal strip, the stator bore frequently becomes out-of-round after separation from the sheet metal strip. This results in an inferior or unacceptable stator core or in the requirement for costly machining or other special processing to make the bore circular.

The manufacture of stator cores for dynamo electric machines is a prime example of the need for improvement in the production technique for sheet metal stampings, especially as applied to progressive die stamping which require apertures and outlines of precise final dimensions.

Although this need has been known in sheet metal stamping industry for a long time, the prior art has not produced a satisfactory solution.

In the prior art patent to Furth U.S. Pat. No. 2,085,092 granted Jun. 29, 1937, a process is described for fabricating laminations for electromagnetic cores by progressive die stamping wherein the outline of the lamination is substantially fully cut at a first stamping station leaving short uncut portions which are cut at a subsequent station. The invention of this patent is directed to the problem of avoiding strains in the magnetic material which are detrimental to its magnetic properties and utilizes an annealing step between the stamping stations to relieve strains. The Furth patent does not address the problem of achieving precise shapes and dimensions in the finished lamination.

The Sleeter U.S. Pat. No. 2,304,607 granted Dec. 8, 1942 describes a method of making a motor stator which is built up of laminations which are cut out of sheet metal strip by die stamping. In this method, the laminations are stacked on a mandrel to obtain alignment with respect to their internal margins and then they are secured together by rivets. The internal margin is described as being out of alignment or off center due to inaccuracy of the dies which, even though very slight, may result in out-of-round bores. In order to true the stator bore, a burnishing broach is forced through the bore.

In the Gerstle U.S. Pat. No. 3,834,013 granted Sep. 10, 1974, a method is described for forming a finished bore size in laminated stator cores. This patent describes a method in which a heat expandable cylindrical fixture is mounted in an out-of-round bore which is initially formed in a stack of stator laminations. The fixture and the stack are heated to a high temperature so that the fixture is thermally expanded against the sides of the bore to develop radial force which deforms the bore sides into conformity with the expanded circumference of the fixture. This provides a stator bore size having a circular configuration with closely controlled dimensional tolerances.

Also in the prior art is a publication entitled "Lamination Die Design" by G. W. Greenway which was published in the November-December, 1981 issue of the Carbide & Tool Journal. This publication describes certain features of a lamination die for thin metal stamping of great precision in progressive die operations, especially for the manufacture of stator laminations.

The prior art has addressed the problem of achieving dimensional accuracy in finished sheet metal parts only by improved precision in the design and making of the dies and by machining or deforming the margin defining an opening, such as a circular bore, after the stamped part is separated from the sheet metal strip.

An objective of this invention is to provide an improved technique for producing sheet metal stampings with apertures and outlines of precise final dimensions and shapes.

SUMMARY OF THE INVENTION

In accordance with this invention, a method and apparatus are provided for die stamping an aperture in a sheet metal strip without producing stress induced distortion of the aperture shape after cutting the strip. This is accomplished by punching an aperture in the sheet metal strip, cutting the strip with a cut-off punch and peening the sheet metal to form a pair of dents therein on opposite sides of the aperture on a line parallel with the cut-off punch.

Further, in accordance with this invention, a method and apparatus are provided for making sheet metal parts with round holes from a sheet metal strip using progressive stamping dies. This is accomplished by punching a round hole in the sheet metal part at one station, peening two dents in the sheet metal part on opposite sides of the hole and between the hole and the edge of the sheet metal strip, and cutting the part from the sheet metal strip.

Further, in accordance with this invention, a method and an apparatus are provided for making stator laminations with circular stator bores from a sheet metal strip using progressive stamping dies. This is accomplished, by stamping a separate stator lamination out of successive regions of the sheet metal strip by punching a circular stator bore in the strip at one die station, punching a set of stator slots at another station, peening a dent in the sheet metal strip between the stator bore and one edge of the strip and peening another dent between the stator bore and the other edge of the strip, and cutting the stator lamination from the strip. The peening step may be done before, after or during the punching of the stator bore. Preferably, the dents are located substantially diametrically opposite each other with respect to the bore.

Further, in accordance with this invention, a sheet metal plate for use as a stator lamination of a rotating electrical machine is provided with circular stator bore formed by punching the sheet metal in a progressive stamping operation. The plate is provided with a dent formed by peening between the bore and one edge of the strip and with another dent formed by peening between the bore and the other edge of the strip. The plate is bounded by a pair of edges extending transversely of the afore-mentioned edges and formed by a cut-off operation in the progressive stamping.

A complete understanding of this invention may be obtained from the detailed description that follows taken with the accompanying drawings.

DESCRIPTION OF THE DRAWINGS

FIG. 1 shows stator lamination blanks made with progressive stamping dies in accordance with the prior art;

FIG. 2 shows stator lamination blanks made with progressive in accordance with this invention;

FIG. 3 shows a detail of an example of a stator lamination made in accordance with this invention;

FIG. 4 is a view taken on lines 4-4 of FIG. 3;

FIG. 5 a perspective view of a punch press with progressive stamping dies for producing stator laminations;

FIG. 6 the succession of stator blanks which are produced in a sheet metal strip as it advances through the progressive die stages of FIG. 5;

FIG. 7 is an elevation view of progressive stamping dies with a bridge stripper incorporating the apparatus of this invention;

FIG. 8 is an elevation view of progressive stamping dies with a spring stripper incorporating this invention;

FIG. 9 an elevation view partially in section showing a peening apparatus in accordance with this invention; and FIG. 10 shows a detail of construction.

BEST MODE FOR CARRYING OUT THE INVENTION

Referring now to the drawings, there is shown an illustrative embodiment of this invention in a method and apparatus for making stator laminations in progressive stamping dies which produce finished laminations with a circular stator bore. It will be appreciated, as the description proceeds, that the invention may be used for making a wide variety of stamped metal parts free of stress-distortion of certain dimensions in the finished part. Further, it will be appreciated that the invention may be realized in a wide variety of embodiments.

FIG. 1 illustrates stator lamination blanks made in progressive stamping dies in accordance with the prior art to produce a finished stator lamination 10a'. The stator lamination blank 12a is shown at a slot-cutting die station which stamps the sheet metal to form the stator slots 14a around the stator bore 16a which was formed at a previous die station. The blank 12a is in the same form at the succeeding idle station wherein the blank is held while the preceding blank 10a at a cut-off station is severed from blank 12a along the cut-off line 18a. The blank 10a at the cut-off station prior to cut-off has a stator bore 16a which is circular within prescribed tolerances as it was initially formed in the preceding bore-cutting die station. However, the finished lamination 10a', which results from the cut-off operation, has a stator bore 16a' which is non-circular with an out-of-roundness exceeding the prescribed tolerances. After the cut-operation, off operation, the stator bore 16a', without further processing, becomes oval with the smaller dimension on line with the progression of the stamping dies, i.e. in the direction of feed of the sheet metal strip.

It has been discovered, in accordance with this invention, that the out-of-roundness of the stator bore can be avoided in the finished lamination by a peening operation on the sheet metal from which it is formed. In the preferred embodiment of the invention, the peening is executed on the blank prior to the cut-off station. The peening operation could be performed after the cut-off station by a special station for such purpose, but after the part is cut-off from the strip, special handling would be required.

FIG. 2 shows the successive stator lamination blanks which correspond with those shown in FIG. 1 except that the finished lamination 10' is made in accordance with this invention and has a circular stator bore 16. The stator lamination blank 12 is illustrated at a die station which punches the stator slots 14 around the stator bore 16 which was punched at a preceding die station and was formed circular within prescribed tolerances. The blank 11 is shown in a peening station wherein it is peened to form elongated dents 32 and 32' at substantially diametrically opposite locations in the respective stator teeth 34 and 34'. The dents 32 and 32' are substantially identical and dent 32 is shown in greater detail in FIGS. 3 and 4. Reverting back to FIG. 2, the blank 10 is cut off along the line 18 from blank 11 to produce the final lamination 10' as a separate piece. The finished lamination 10' has a circular bore 16 within the prescribed tolerances.

The reason why the peening operation causes the finished lamination to recover the circular bore shape is not fully understood at this time. However, it is believed that localized peening sets up stresses in the metal which counteract stresses induced in the metal by the punching operations to form apertures in the lamination or an outline or boundary of the lamination, either before, after or during the peening operation. In the illustrative embodiment, it is believed that the cut-off operation produces stresses in the material which distort the stator bore from its originally formed shape causing it to become oval with a smaller dimension on line with the progression of the sheet metal through the dies. According to the invention, such stress distortion is offset by counteracting stresses in the material so that distortion is prevented or corrected, as the case may be.

Apparatus for carrying out the preferred embodiment of the invention will now be described with reference to FIGS. 5 through 10. FIG. 5 depicts a punch press 50 which is fitted with a progressive stamping die set 52 and a bridge stripper 54. In general, the progressive die set 52, as best shown in FIG. 5, comprises a succession of stations designated A through F. The dies are retained in a die shoe 56 which is mounted on the bed or lower fixed platen 58 of the press 50. The bridge stripper 54 is mounted on the die shoe 56 over the dies which are not shown. The top shoe 62 is provided, at selected stations, with a punch or a cluster of punches, as the case may be, which coact with the respective dies in the die shoe 56. Guide plates such as 74A, 74B, and 74D, for the punching tools are mounted at respective stations on the bridge stripper 54. The top shoe 62 is mounted on the ram or upper platen 64 of the press 50 and is reciprocated thereby in a well-known manner. The apparatus as described with reference to FIG. 5, suitably of conventional design, is well-known in the art except for the addition, in accordance with this invention, of the peening apparatus 60 for producing dents in the sheet metal at selected locations. In the illustrative embodiment, two sets of peening apparatus 60 are provided to produce a pair of dents adjacent opposite edges of the sheet metal strip, as will be described in detail subsequently. As best shown in FIG. 7, the top shoe 62 carries punch cluster 72A at station A, a single punch 72B at station B, a punch cluster 72D at station D, and a cut-off punch 72F at station F. A pair of push pins 72 are carried by the top shoe 62 at station E (only one is shown). Each pin 70 actuates a respective peening apparatus 60 (only one is shown). In this arrangement, station C is an idle station, i.e. there is no operation at that station.

The stock of sheet metal strip 82 is fed from a supply coil 84 through the progressive stamping die set 52 in intermittent movement coordinated with the strokes of the press 50 in a well-known manner. The finished parts 10′ are fed out of the machine at the delivery station. In the arrangement just described, station C is an idle station. As described below, it may be used for the peening station instead of station E.

Referring now to FIG. 6, the sheet metal strip 82 is depicted with successive sheet metal blanks of the stator lamination as they are formed at the corresponding station in the progressive die set. At station A, the sheet metal blank 15 is stamped to form a center rotor bore 92, a set of rotor apertures 94 and a set of four pilot pin holes 96. At station B, the blank 13 is stamped to punch out the rotor lamination 98 and form the stator bore 16. Station C is an idle station and the blank 13 is not altered from that produced at station B. At station D, the blank 12 is formed with the complete set of stator slots, such as slot 34, surrounding the stator bore 16. Located at station E, are two sets of the peening apparatus to form the dents 32 and 32′ in the teeth 34 and 34′. At station F, the blank 10 is cut-off from the blank 11 along the cut-off line 18. The finished lamination 10′, has a circular stator bore 16.

As noted above, the peening apparatus 60 and corresponding push pin 72 are located at station E and the dents 32 and 32′ are formed in the teeth 34 and 34′ after the slots are punched and before cut-off. As an alternative to this arrangement, the peening operation may be carried out at any suitable station; for example, it may be carried out in station C. At this station, the dents 32 and 32′ are placed in the stator blank 13 at locations which will subsequently be punched out to form stator slots 34 and 34′ at station D. This alternative arrangement which eliminates dents 32 and 32′ from the finished blank 10′ may be preferable if dents in the finished laminations are undesirable.

The peening apparatus 60 will now be described with reference to FIGS. 7, 9 and 10. In the preferred embodiment, as described above, the peening apparatus 60 is located at station E as depicted in FIGS. 7 and 8. The details of the peening apparatus are shown in FIGS. 9 and 10.

The peening apparatus 60 comprises, in general, a peening tool 102 which is carried by a tool retainer or holder 104 mounted for reciprocation in the bridge stripper plate 54 and which is actuated by the push pin 72. The tool holder 104 for the peening tool 102 comprises a cylindrical body with an enlarged head 105. The tool holder 104 is slidably mounted in a bushing 106 in the stripper 54. A pair of limit stops 108 are mounted on the stripper 54 at diametrically opposite locations adjacent the enlarged head 105 of the tool holder. Each of the stops 108 is provided with an overhanging flange which is adapted to engage an abutment surface on the enlarged head 105 to limit the upward movement of the tool holder 104. The tool holder is biased upwardly relative to the stripper 54 by a helical spring 112 interposed between the bushing 106 and the head 105.

The peening tool 102 is adjustably mounted in the tool holder 104 in order to allow adjustment of the depth of indentation in the sheet metal strip which passes in the clearance space between the die shoe 56 and the stripper 54. The peening tool 102 comprises a peening punch 116 with a tool head 118. The tool 102 is disposed within a cylindrical bore 122 in the tool holder 104. More particularly, the tool head 118 is slidably disposed in the bore 122 and a helical spring 124 is disposed in an enlarged section of the bore and urges the tool 102 upwardly. For this purpose, the spring 124 is seated on an annular shoulder formed at the enlarged section of the bore and, at its upper end, bears against an annular shoulder formed by an enlarged portion of the tool head 118. The peening tool 102 is adjustably positioned in the tool holder 104 by a set screw 126 which threadedly engages the upper end of the bore 122. The peening punch 116 is a blade-shaped peening tool which is oriented with the length of the blade extending substantially perpendicularly of the direction of movement of the sheet metal strip.

The push pin 72 carried by the top shoe 62 is spring loaded in a conventional manner (not shown) in the top shoe and retained on the shoe by a collar 132. The spring load on the push pin 72 is, of course, sufficiently great that it does not yield during the peening operation.

The peening apparatus is shown in FIG. 9 with the push pin 72 in engagement with the head 105 of the tool holder 104 so that the tool holder is displaced downwardly away from the stops 108. For explanatory purposes, it is assumed that the ram of the press, and hence the top shoe 62, are at the bottom of the stroke. In this position, the tool holder 104 is at its lowermost position and should not be in engagement with the sheet metal blank to be peened. The peening tool 102 is positioned by the setting of the set screw 126 so that the tip of the punch 116 produces the desired depth of indentation in the sheet metal blank. The set screw 126 provides a sufficient range of adjustment so that the peening punch 116 may be retracted sufficiently to avoid any engagement with the sheet metal blank in workpieces where no indentation is desired.

In the illustrative embodiment, the stator laminations are formed from coil stock of magnetic alloy which typically has a thickness of 0.025 inches. A typical stator lamination has an outside dimension of four inches and a bore diameter of two and three-fourths inches. The dents 32 and 32′ typically have a length of one-half inch and depth of no more than a few thousandths inches. The peening punch 116 has a blade length of 0.500 inches and a thickness of 0.125 inches. The peening tip of the blade is formed with a radius of 0.100 inches and the ends of the blade have a radius of 0.062 inches.

The preferred embodiment of the invention is illustrated in FIG. 8 in connection with a progressive stamping die set with a spring stripper 154, instead of the bridge stripper 54 of FIG. 7. The invention is implemented in the same way as previously described, except that the peening apparatus 60 is mounted on the spring stripper 154 at the desired station.

It is known that different coils of sheet metal, even though of the same specification, have a different tendency toward distortion of punched apertures. Accordingly, it is necessary when running a new coil of sheet metal strip, to adjust the setting of the peening tool to obtain denting with the required depth to produce an undistorted aperture in the finished part. This may be done routinely by the machine operator by running a few parts and increasing or decreasing the depth of indentation to produce parts which are within specified tolerances. In some sheet metal stock it may be found that no indentation is required.

Although the description of this invention has been given with reference to a particular embodiment, it is not to be construed in a limiting sense. Many variations and modifications will no occur to those skilled in the art. For a definition of the invention reference is made to the appended claims.

What is claimed is:

1. The method of making sheet making parts with round holes from a sheet metal strip using progressive stamping dies wherein the sheet metal strip is moved longitudinally through plural die stations in succession and a separate part is stamped out of successive regions of said sheet metal strip by two or more of said die stations, said method comprising the steps of:

punching a round hole in the sheet metal part at one station, peening two dents in the sheet metal part on opposite sides of the hole and between the hole and the edge of the sheet metal strip, punching a plurality of stator winding slots in circumferentially spaced relation around said hole and opening into said hole whereby a plurality of stator teeth are formed surrounding said hole, the peening step being done after the slot punching step, with each of said dents located in one of said teeth, and in a station subsequent to the aforesaid steps, cutting the part from the sheet metal strip.

2. The method of making sheet metal parts with round holes from a sheet metal strip using progressive stamping dies wherein the sheet metal strip is moved longitudinally through plural die stations in succession and a separate part is stamped out of successive regions of said sheet metal strip by two or more of said die stations, said method comprising the steps of:

punching a round hole in the sheet metal part at one station, peening two dents in the sheet metal part on opposite sides of the hole and between the hole and the edge of the sheet metal strip, punching a plurality of winding slots in circumferentially spaced relation around said hole with said slots opening into said hole thereby forming a plurality of spaced stator teeth surrounding said hole, the peening step being done before said slot punching step with each of said dents being located on the sheet metal portion which is punched out to form a slot, and in a station subsequent to the aforesaid steps, cutting the part from the sheet metal strip.

* * * * *